(12) United States Patent
Valasek et al.

(10) Patent No.: US 9,358,646 B2
(45) Date of Patent: Jun. 7, 2016

(54) SUPPORTING STRUCTURE FOR REPOSITIONABLE AND RECONFIGURABLE MANIPULATING ARMS

(71) Applicant: CVUT V PRAZE, FAKULTA STROJNI, Prague (CZ)

(72) Inventors: Michael Valasek, Prague (CZ); Martin Smrz, Prague (CZ); Petr Svatos, Pysely (CZ); Pavel Kukula, Lanskroun (CZ); Tereza Kasparkova, Ceska Skalice (CZ); Milan Ruzicka, Praha 4 (CZ); Ondrej Uher, Susice (CZ)

(73) Assignee: CVUT V PRAZE, FAKULTA STROJNI, Prague (CZ)

( * ) Notice: Subject to any disclaimer, the term of this patent is extended or adjusted under 35 U.S.C. 154(b) by 0 days.

(21) Appl. No.: 14/378,020

(22) PCT Filed: Feb. 11, 2013

(86) PCT No.: PCT/CZ2013/000011
§ 371 (c)(1),
(2) Date: Aug. 11, 2014

(87) PCT Pub. No.: WO2013/120462
PCT Pub. Date: Aug. 22, 2013

(65) Prior Publication Data
US 2015/0020365 A1    Jan. 22, 2015

(30) Foreign Application Priority Data

Feb. 13, 2012    (CZ) ........................................ 2012-99

(51) Int. Cl.
*B23P 19/04*    (2006.01)
*B25J 15/00*    (2006.01)
*F16M 1/00*    (2006.01)

(52) U.S. Cl.
CPC .............. *B23P 19/04* (2013.01); *B25J 15/0061* (2013.01); *F16M 1/00* (2013.01); *Y10T 29/49826* (2015.01)

(58) Field of Classification Search
CPC ... B23P 19/04; B25J 15/0061; B25J 17/0266; B25J 17/0216; B25J 9/0057; F16M 1/00; B23Q 1/5462; B66C 1/02
USPC ............... 248/274.1, 581; 74/490.06, 479.01; 901/27, 28, 29
See application file for complete search history.

(56) References Cited

U.S. PATENT DOCUMENTS 4,300,362 A * 11/1981 Lande ...................... B23Q 1/50
414/1
4,511,115 A * 4/1985 Ludwigsen ............. B63B 35/44
108/136

(Continued)

FOREIGN PATENT DOCUMENTS

DE    10 2007 039 384    2/2009
WO    WO 2012/163390    12/2012

*Primary Examiner* — Anita M King
(74) *Attorney, Agent, or Firm* — Preti Flaherty Beliveau & Pachios LLP (57) ABSTRACT

A supporting structure for positioning manipulating arms that may be fitted with tools. The manipulating arms are unblocked for their relocation and/or for relocation of tools or parts held by the manipulating arms. Relocation of the manipulating arms into a new position is by means of a robot. Once relocated, the manipulating arms are again blocked. A supporting frame is fitted with at least one sliding guide and/or spherical joint in which each manipulating arm is movably disposed. Blocking and unblocking of the manipulating arms is achieved through the use of pneumatic or electrical power.

11 Claims, 12 Drawing Sheets

(56) References Cited

U.S. PATENT DOCUMENTS

| | | | | |
|---|---|---|---|---|
| 4,651,589 A | * | 3/1987 | Lambert | B25J 9/1095 180/7.1 |
| 4,976,582 A | * | 12/1990 | Clavel | B25J 9/1065 108/138 |
| 5,053,687 A | * | 10/1991 | Merlet | F16H 21/46 318/566 |
| 5,114,300 A | * | 5/1992 | Shahinpoor | E04B 1/3205 248/654 |
| 5,740,699 A | * | 4/1998 | Ballantyne | B25J 17/0266 403/120 |
| 6,330,837 B1 | * | 12/2001 | Charles | A61B 19/22 74/490.06 |
| 7,172,385 B2 | * | 2/2007 | Khajepour | B25J 17/0266 414/735 |
| 7,498,758 B2 | * | 3/2009 | Baba | B25J 17/0216 318/568.11 |
| 8,307,732 B2 | * | 11/2012 | Kinoshita | B25J 17/0266 74/490.01 |
| 2003/0177656 A1 | | 9/2003 | Sawdon | |
| 2009/0193642 A1 | | 8/2009 | Lin et al. | |
| 2010/0313695 A1 | | 12/2010 | Valasek | |
| 2013/0142608 A1 | * | 6/2013 | Zhang | B25J 9/0051 414/729 |

\* cited by examiner

SUPPORTING STRUCTURE FOR REPOSITIONABLE AND RECONFIGURABLE MANIPULATING ARMS

BACKGROUND OF THE INVENTION

The invention concerns a method for setting a position of manipulating arms on a supporting frame and a supporting frame for positioning the manipulating arms fitted with tools for attaching technological or measuring means.

For car bodywork manufacture, frames with many suckers fixed to a network of points on a frame are used. The frame is manipulated by a robot. A plate is attached to the frame by sucking the suckers in many points numbering an order of tens and it is put into a press by the robot. The pressed plate is attached to the frame by sucking in many points again and it is taken out from the press by the robot. A problem is to re-arrange the suckers or other active members on a frame when switching-over from pressing one component to another component. It would be very costly to fit a frame with as many actuators or sensors as suckers or other action members. Another problem is a fact that actuators would probably include metal components and there is a tendency to make the frame with suckers or other action members from nonmetallic easily deformable materials. The reason is that a robot malfunction occurs from time to time and a frame gets pressed together with a plate. If the frame included metal components, the press die damage would occur resulting in a large loss. If the frame is made from nonmetallic easily deformable materials, the press die damage will not occur and a loss will be far smaller. For example carbon fiber composites are an example of nonmetallic materials. As such a frame with many actuators and sensors would be too expensive and complicated, frames are re-arranged manually and this requires a storehouse for these frames.

A similar frame can include other mechanisms for handling, for measuring and/or machining or forming.

A disadvantage of these frames is both their price and complexity at higher number of actuators and sensors and difficultness of the manufacture of particular components on a frame or, on the contrary, manual work required.

The aim of this invention is to simplify relocation of suckers, or more precisely tools for attaching technological or measuring members positioned on a supporting frame and to design manipulating arms for carrying these suckers, or more precisely tools, made mainly from nonmetallic easily deformable materials.

BRIEF SUMMARY OF THE INVENTION

The subject matter of a method for setting a position of manipulating arms fitted with tools for attaching technological or measuring members positioned on a supporting frame according to this invention lies in a fact that individual manipulating arms get unblocked for relocation in their placement and/or in their mutually moveable parts, are relocated by means of a robot into a new demanded position where they are blocked in their placement and/or in their mutually moveable parts.

The manipulating arms get blocked by connecting movement blocking elements and rotation blocking elements in the placement of the manipulating arms and/or between their mutually moveable parts to a source of pneumatic or hydraulic or electrical power and get unblocked by disconnecting from the source of pneumatic or hydraulic or electrical power. Relocation of the manipulating arms to a demanded position is performed by means of a robot or by clamping them in a fixture and repositioning the supporting frame by the robot.

Before relocation of the manipulating arms to the demanded position, the supporting frame is clamped in a fixture for determination of its position towards the robot. The position of the manipulating arms is measured by the position of the robot grab which carries out relocation of the repositionable arms, while scanning a position of luminous spots on the manipulating arm or on the robot grab relocating the manipulating arms with the aid of digital cameras or video-cameras.

The subject matter of this invention of the supporting frame for placement of the manipulating arms fitted with tools for attaching technological or measuring members lies in the fact that the supporting frame (1) is fitted with at least one sliding guide (3) and/or spherical joint (16) in which a manipulating arm consisting at least of two mutually moveable parts is placed moveably, whereas the manipulating arm is fitted with blocking elements for blocking and unblocking motion in its placement and motion of its mutually moveable parts. The blocking elements are connected to a source of pneumatic or hydraulic or electrical power.

The manipulating arm is placed in the sliding guide of the supporting frame and fitted with at least one rotational joint connected to a tool holder, whereas the sliding guide is fitted with a movement blocking element and the rotational joint is fitted with a rotation blocking element.

Within the invention, a manipulating arm can be created with a variable arrangement of movements and rotational joints as it is apparent from the description and Claims bellow, likewise it is possible to create a manipulating arm with the aid of suspension arms fitted with blocking elements of movement and/or rotation or swiveling and one or more additional platforms for attaching a tool. It is advantageous to connect suspension arms to the supporting frame or platform by means of spherical joints.

BRIEF DESCRIPTION OF THE SEVERAL VIEWS OF THE DRAWINGS

In the attached figures the manipulating arms on the supporting frame and their alternative embodiments are depicted schematically, where FIG. 1—a basic embodiment of a manipulating arm on a supporting frame, FIG. 2—the arrangement of the manipulating arm from FIG. 1, FIG. 3—the supporting frame from FIG. 1 with a robot connected to a tool holder and depicting a positioning fixture, FIG. 4—a manipulating arm with devices for scanning a position of the manipulating arm FIG. 5—the embodiment as described in FIG. 4 with a robot, FIG. 6—the supporting frame connected to a robot and a positioning fixture connected to the manipulating arm, FIG. 7—an alternative placement of the manipulating arm, FIG. 8—another alternative embodiment of the manipulating arm, FIG. 9—type of construction of the manipulating arm FIG. 10—another alternative embodiment of the manipulating arm, FIG. 11—another alternative embodiment of the manipulating arm and FIG. 12 to FIG. 23 other alternative embodiments of the manipulating arms by means of parallel kinematic structures.

DETAILED DESCRIPTION OF THE INVENTION

Figure 1:
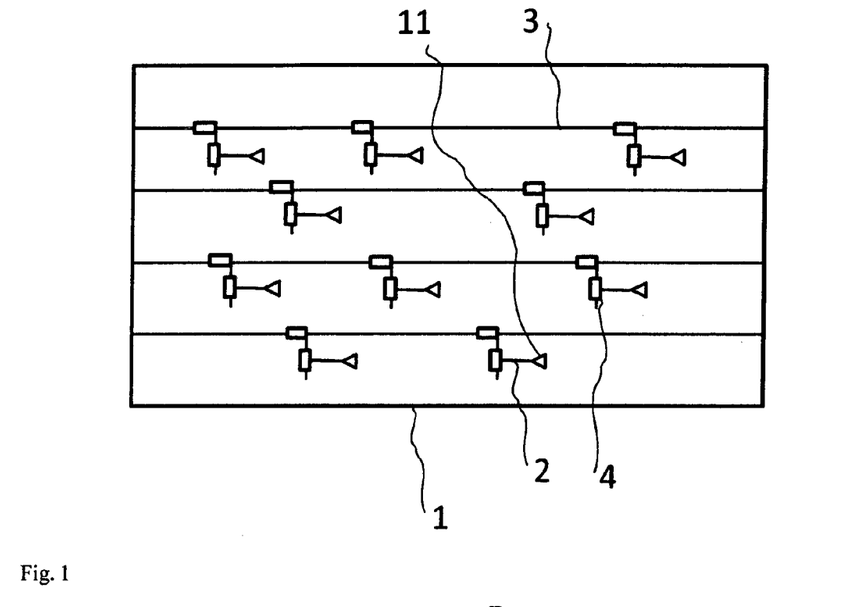

In FIG. 1 there is a schematic depiction of a supporting frame 1 in sliding guides 3 of which manipulating arms fitted with holders 2 of tools 11 are moved; tools 11 are represented e.g. by suckers or measuring probes or grabs or machining tools or welding heads. The manipulating arm is further fitted with a rotational joint 4, so it can be relocated to a different position both by moving along in the sliding guide 3 and by rotating around the rotational joint 4 axis which is perpendicular to the sliding guide 3 within this embodiment.

Figure 2:
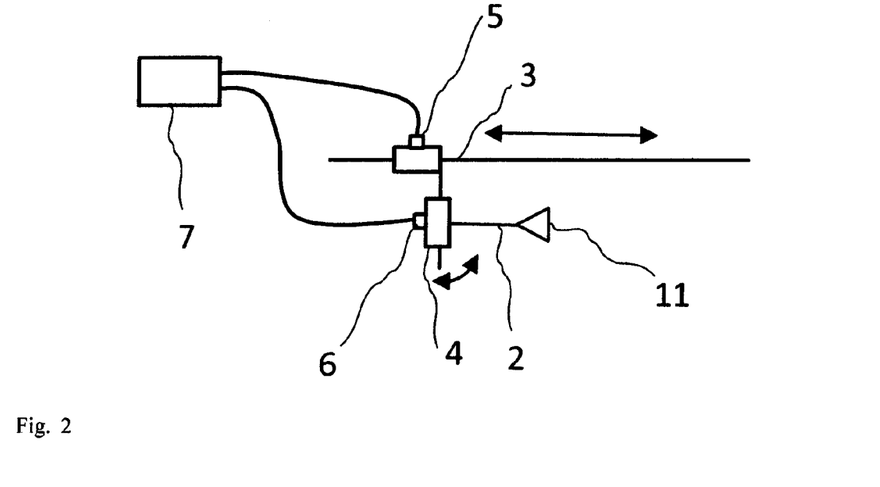

In FIG. 2 there is a depiction of the manipulating arm itself together with a movement blocking element 5 and a rotation blocking element 6 which are arranged on the manipulating arm. Both blocking elements 5 and 6 are connected to a power source 7. The blocking elements 5 and 6 get unblocked by connecting to the power source 7 and the manipulating arm can be moved along in the sliding guide 3 and rotated around the rotational joint 4 axis. Motion of the manipulating arm gets blocked by disconnecting the blocking elements 5 and 6 from the power source 7 and the manipulating arm remains in the set position. The power source 7 can be used as a pneumatic or hydraulic or electrical power source.

Figure 3:
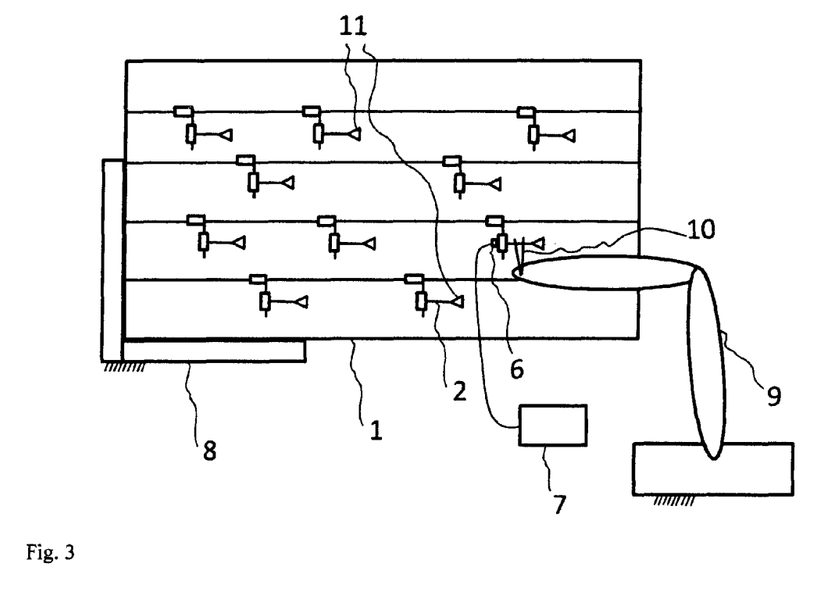

In FIG. 3 there is a depiction of the supporting frame 1 with manipulating arms fitted with tools 11, where the supporting frame 1 is positioned in a positioning fixture 8 and the manipulating arms are relocated to a demanded position by a grab 10 of a robot 9. The manipulating arm position towards the frame 1 is determined based on a position of the grab 10 of the robot 9.

Figure 4:
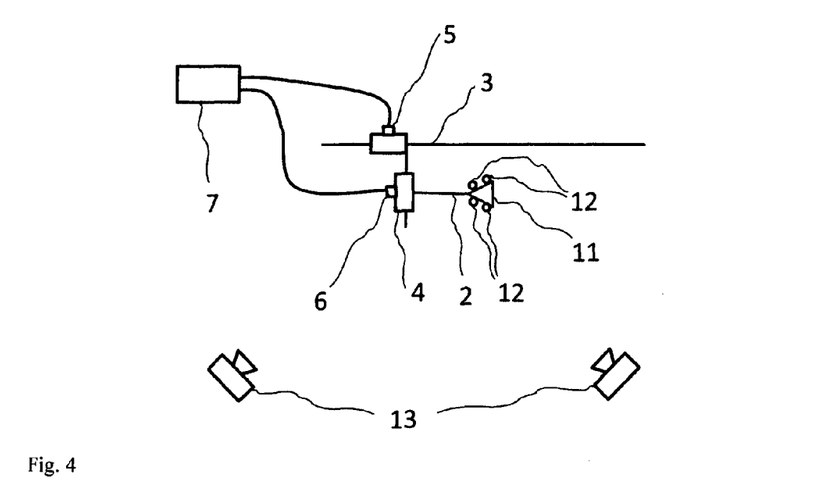

In FIG. 4 there is apparent an arrangement of luminous spots 12, or sources, on the manipulating arm. The luminous spots 12 are scanned by digital cameras or video-cameras 13 attached on the supporting frame 1. There are at least four luminous spots 12 and at least two digital cameras or video-cameras and thus it is possible to determine a manipulating arm position through them.

Figure 5:
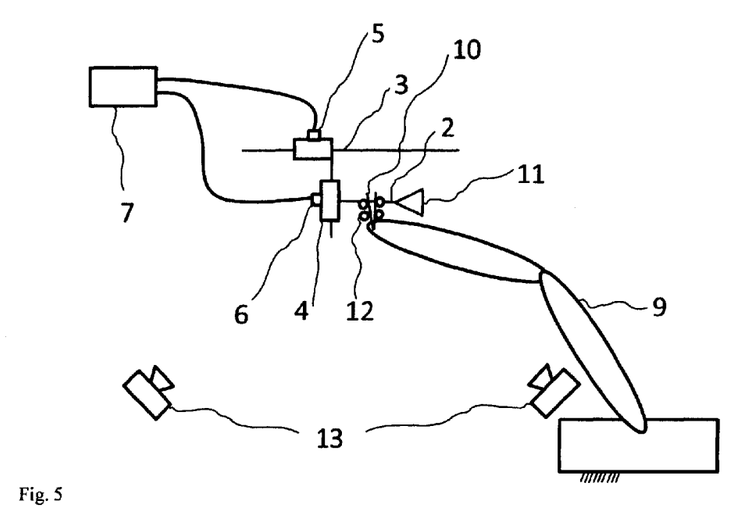

In FIG. 5 there is an arrangement according to FIG. 4 apparent, where grabbing a manipulating arm by the grab 10 of the robot 9 is depicted; the robot 9 is attached to the supporting frame 1, whereas the luminous spots 12 are arranged on the grab 10 of the robot 9 to be scanned by digital cameras or video-cameras 13 in order to determine the manipulating arm position.

Figure 6:
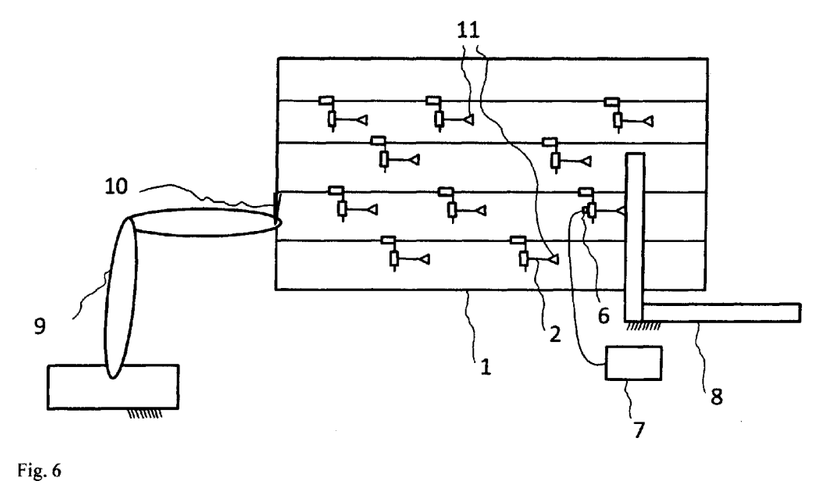

In FIG. 6, in contradistinction to the arrangement according to FIG. 3, the supporting frame 1 is depicted being attached in the grab 10 of the robot 9. The manipulating arm is clamped in a positioning fixture 8. The robot 9 moves the supporting frame 1 by means of the grab 10, so that the manipulating arm with a tool 11 is relocated on the frame 1 to the demanded position. The manipulating arm position is determined based on a position of the grab 10 of the robot 9. Alternatively, the manipulating arm can be fitted with luminous spots 12 scanned by digital cameras or video-cameras 13 and through them the manipulating arm position towards the supporting frame 1 is determined.

Figure 7:
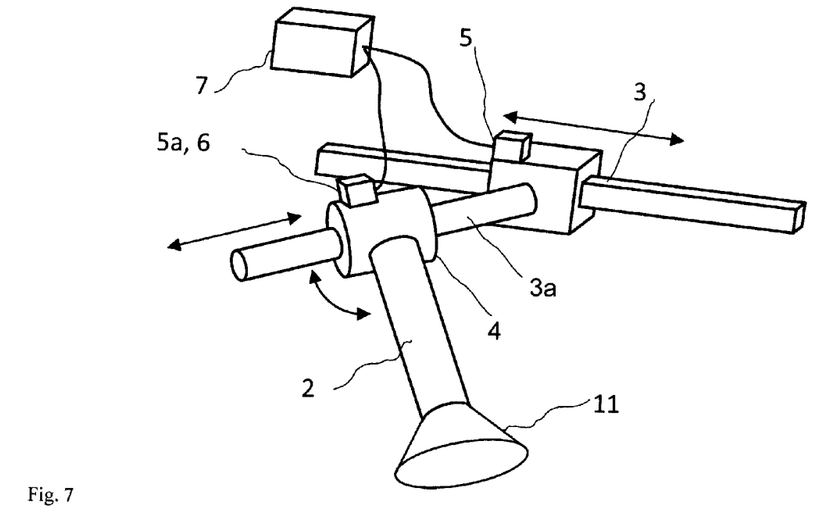

In FIG. 7 the manipulating arm is placed in the sliding guide 3 on the supporting frame 1 and fitted with the blocking element 5 of the sliding guide 3 and at the same time it is placed on a rotational joint 4 with an integrated sliding guide 3a. Movement and rotation of the rotational joint 4 gets blocked or unblocked by the blocking element 6 for rotation and the blocking element 5a for movement. In contrast to the above described embodiments the manipulating arm has three degrees of freedom towards the supporting frame 1, given by two movements and one rotation. Arrows in this one and the following figures demonstrate movability of the manipulating arm in the sliding guides 3 and 3a and in the rotational joint 4.

Figure 8:
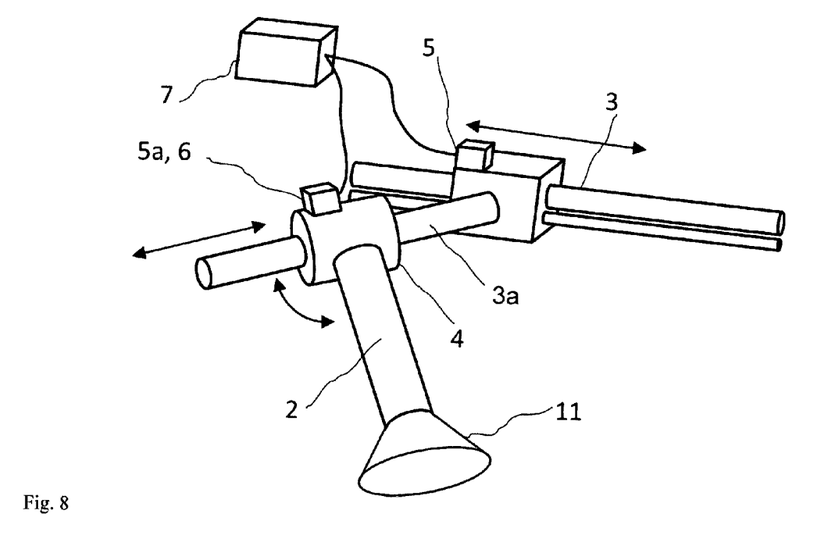

In FIG. 8 there is an example of an embodiment similar to the embodiment in FIG. 7 depicted with an alternative design of the sliding guide 3. Here the manipulating arm has three degrees of freedom towards the supporting frame 1 as well.

Figure 9:
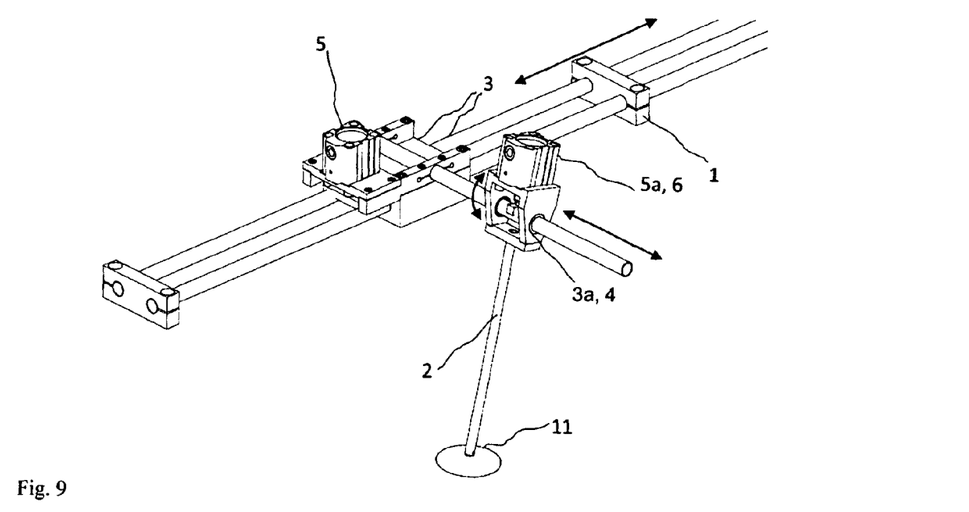

In FIG. 9 there is an example of a type of construction of the manipulating arm from FIG. 8 shown.

Figure 10:
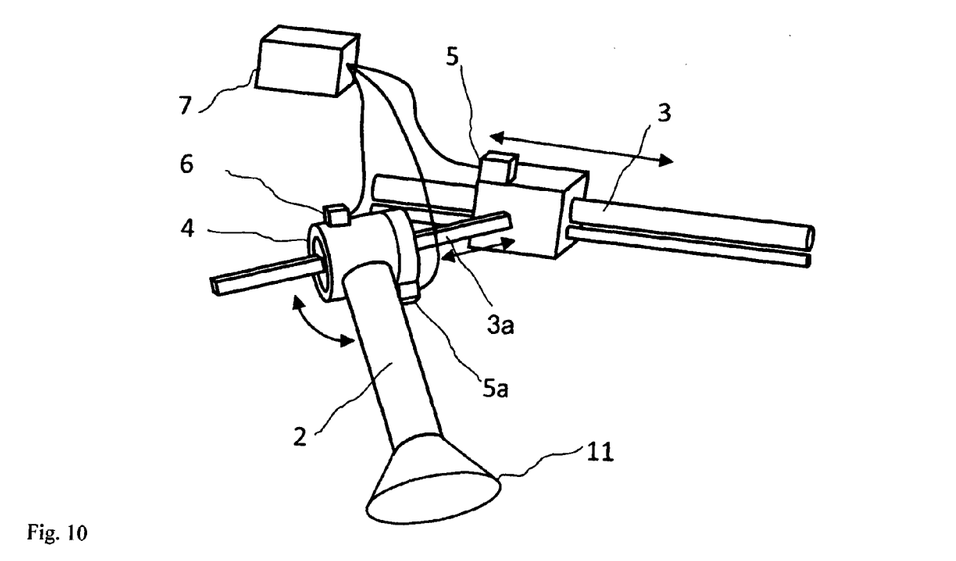

In FIG. 10 there is an example of the embodiment of the manipulating arm from FIG. 8 depicted, where the sliding guide 3a and the rotational joint 4 are separated and similarly the sliding guide 3a is fitted with a separate movement blocking element 5a and a separate rotation blocking element 6. Here the manipulating arm has 3 degrees of freedom towards the supporting frame 1 as well.

Figure 11:
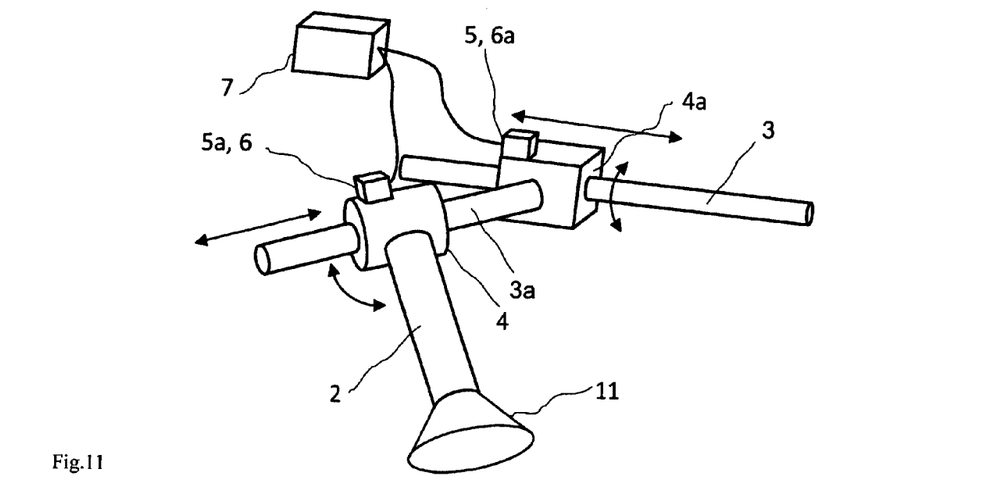

In FIG. 11 there is an embodiment with the manipulating arm placed in two sliding guides 3 and 3a. The sliding guide 3 is in the supporting frame 1. Further, the manipulating arm is fitted with two rotational joints 4 and 4a, so that the sliding guide 3 as well as the sliding guide 3a is integrated with the rotational joint 4 and the rotational joint 4a. So the manipulating arm has four degrees of freedom towards the supporting frame 1.

Figure 12:
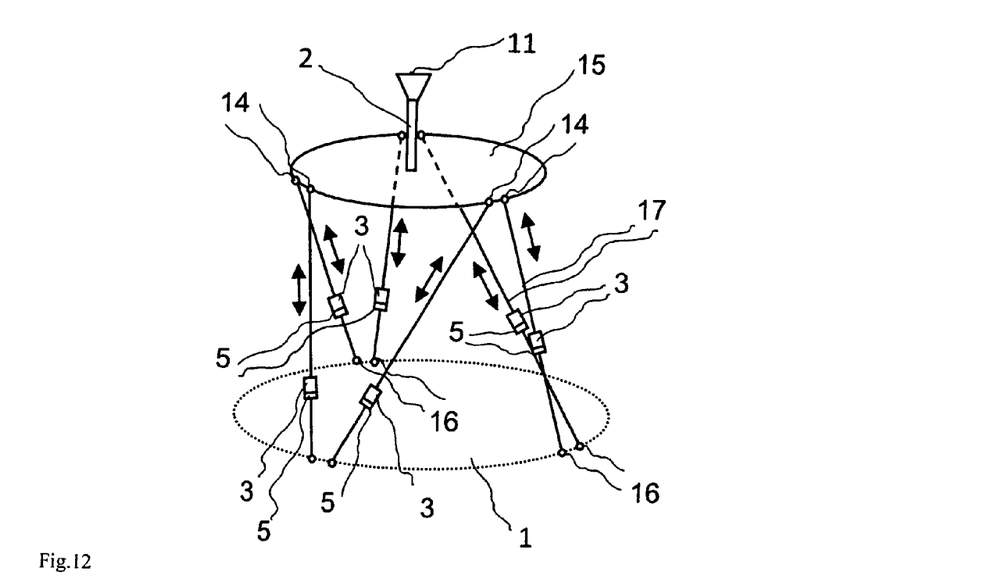

In FIG. 12 there is a depiction of a manipulating arm connected to the supporting frame 1 by means of a parallel kinematic structure of Hexapod type. The manipulating arm comprising a platform 15 is connected to the supporting frame by means of six suspension arms 17 fitted with the sliding guide 3 whereas each suspension arm 17 is fitted with the movement blocking element 5. The suspension arms 17 are connected to the platform 15 of the manipulating arm with the aid of the spherical joints 14 and to the supporting frame 1 with the aid of the spherical joints 16. Within this embodiment the manipulating arm has six degrees of freedom towards the supporting frame 1. In FIG. 12 there are six suspension arms 17 used. However, it is possible to use more suspension arms 17 without increasing number of degrees of freedom of the tool 11 towards the supporting frame 1. There can be seven, eight (Octapod type structure) or more suspension arms 17. For a definite position of the tool 11 there must be six suspension arms 17. Higher number of the suspension arms 17 leads to higher rigidity of the tool 11.

Figure 13:
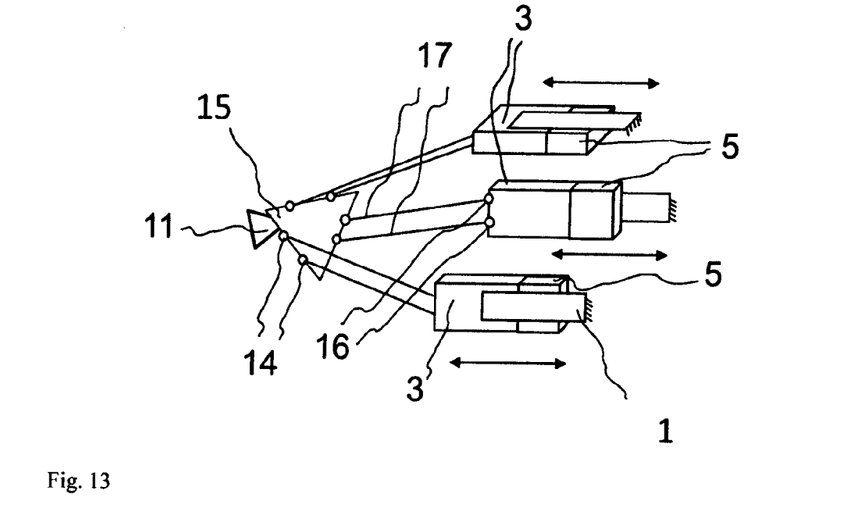

In FIG. 13 there is a depiction of another alternative embodiment of the manipulating arm, where its platform 15 carrying the tool 11 is connected to the supporting frame 1 by means of three couples of the suspension arms 17 connected both through the spherical joints 16 to the sliding guides 3 fitted with the movement blocking element 5 on the supporting frame 1 and by means of the spherical joints 14 with the platform 15 carrying the tool 11. Within this embodiment the manipulating arm has three degrees of freedom towards the supporting frame 1.

Figure 14:
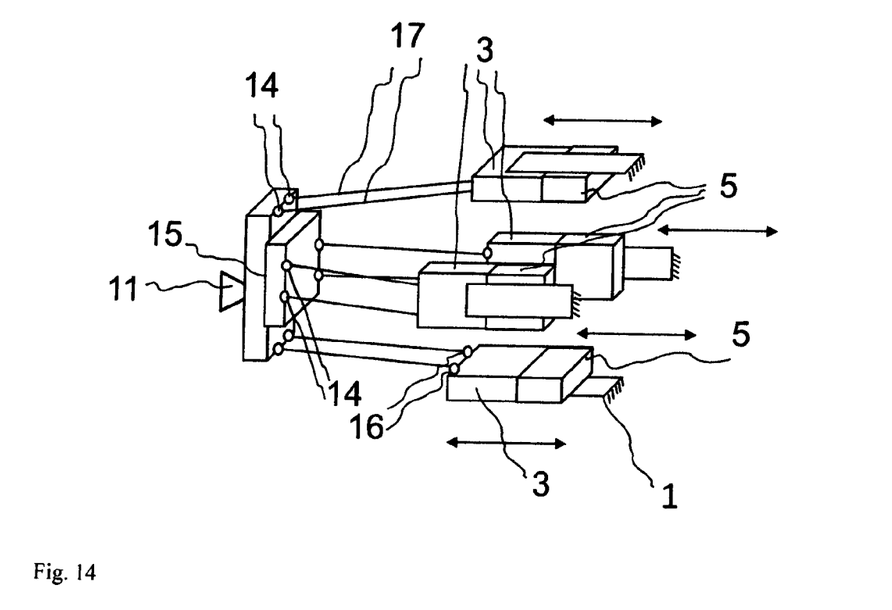

In FIG. 14 there is a depiction of an embodiment of the manipulating arm with two mutually fixed platforms 15 where each of these platforms 15 is connected to two couples of the suspension arms 17 with the sliding guide 3 on the supporting frame 1 by means of the spherical joints 14. The suspension arms are connected to the sliding guides 3 by means of the spherical joints 16. Each sliding guide 3 is fitted with the movement blocking element 5. Within this embodiment the manipulating arm has three degrees of freedom towards the supporting frame 1. Higher number of the suspension arms 17 within this embodiment increases rigidity of attachment of the manipulating arm to the frame 1.

Figure 15:
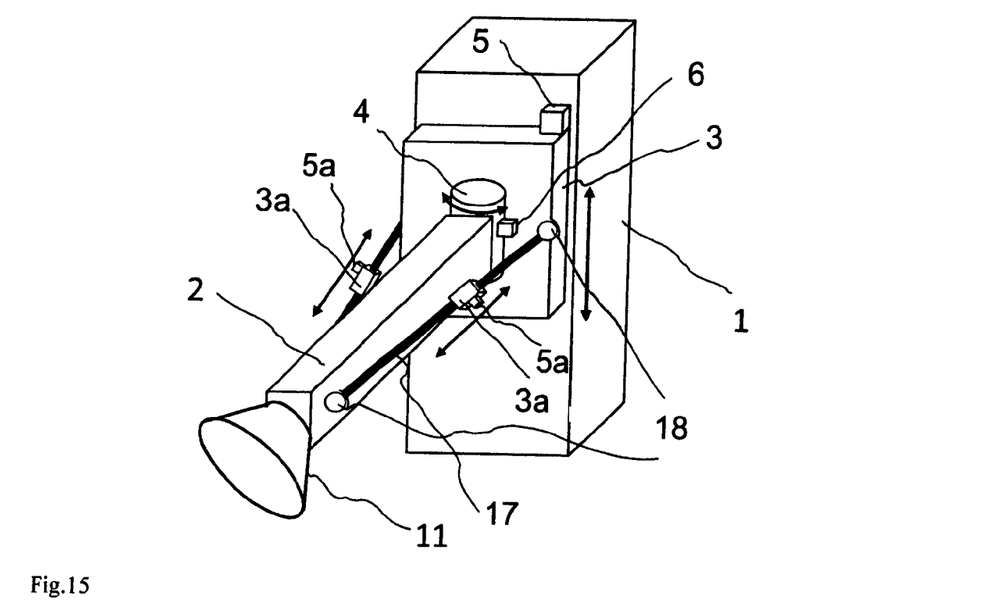

In FIG. 15 there is a depiction of another alternative embodiment of the manipulating arm moved along in the supporting frame 1, whereas a part of the manipulating arm moved along in the supporting frame 1 is connected to the tool 11 by means of the rotational joint 4. Rotation of the manipulating arm in the rotational joint 4 is performed by means of two suspension arms 17 fitted with the sliding guide 3a and the movement blocking elements 5*a*. The suspension arms are connected by means of the spherical joints 18 both to the moveable part of the sliding guide 3 in the supporting frame 1 and to the swiveling part of the tool holder 2. The suspension arms 17 can be alternatively made of strings or cords. Within this embodiment the manipulating arm has two degrees of freedom towards the supporting frame 1.

Figure 16:
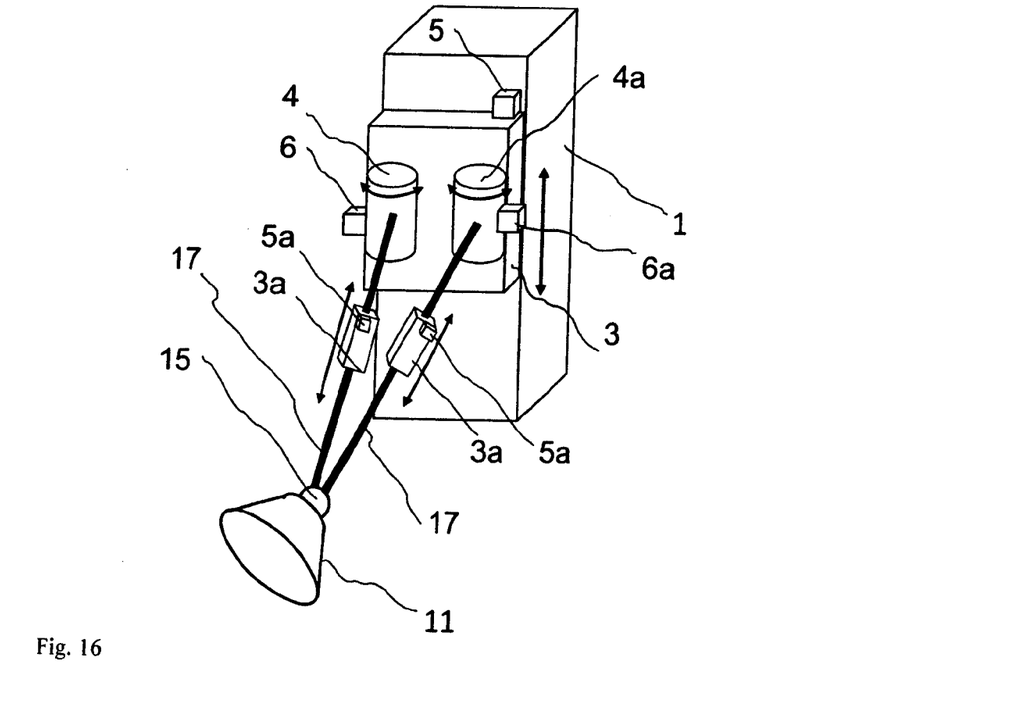

Within the embodiment according to FIG. 16 the manipulating arm consists of two suspension arms 17 connected on their free ends through a spherical joint or rotational joints to the platform 15 carrying the tool 11 and to a separate rotational joint 4 on the opposite ends of each of them; the rotational joints 4 are arranged on the moveable part of the sliding guide 3. The suspension arms 17 are fitted with the sliding guides 3*a* and the movement blocking elements 5*a*, the sliding guide in the supporting frame 1 is also fitted with the movement blocking elements 5 and the rotational joints 4 are fitted with the rotation blocking elements 6. Within this embodiment the manipulating arm has three degrees of freedom towards the supporting frame 1, provided the suspension arms 17 are connected to the platform 15 through the rotational joints and six degrees of freedom towards the supporting frame 1 provided the suspension arms 17 are connected to the platform 15 through the spherical joints. Within this embodiment with six degrees of freedom, as well as within the embodiment in FIG. 17, number of degrees of freedom which are blocked by the movement blocking elements 5 or the rotation blocking elements 6 is smaller than the total number of degrees of freedom. Then the tool 11 is freely moveable towards the platform 15 which helps to adapt the tool orientation towards the object upon which it is acting. This movability is usually limited by friction in spherical joints. Within all other embodiments the tool 11 can be also connected to the platform 15 by a freely moveable spherical joint with friction, which is not depicted in the figures.

Figure 17:
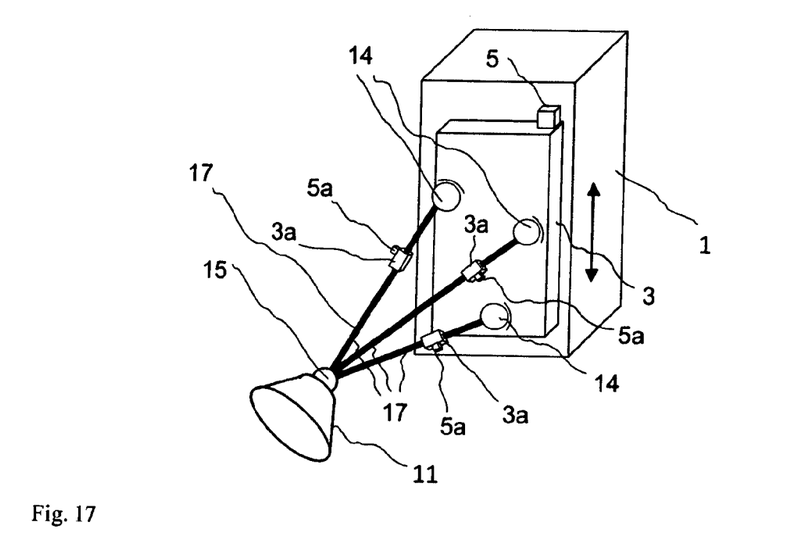

According to FIG. 17 the tool 11 is placed on the platform 15 through spherical joints by means of three suspension arms 17 connected on opposite ends to the moveable part of the sliding guide 3 through the respective spherical joints 14. Each of the suspension arms 17 is fitted with the sliding guides 3*a* and the movement blocking elements 5*a*, the sliding guide 3 in the supporting frame 1 is also fitted with the movement blocking element 5. Within this embodiment the manipulating arm has six degrees of freedom towards the supporting frame 1, from which three degrees of freedom determining the Cartesian position of the platform 15 in space are determined by a position of the guide 3 and by length of three suspension arms 17, which are defined by the movement blocking elements 5 and 5*a*, and three degrees of freedom determining swiveling of the tool 11 are freely moveable, limited only by friction.

Figure 18:
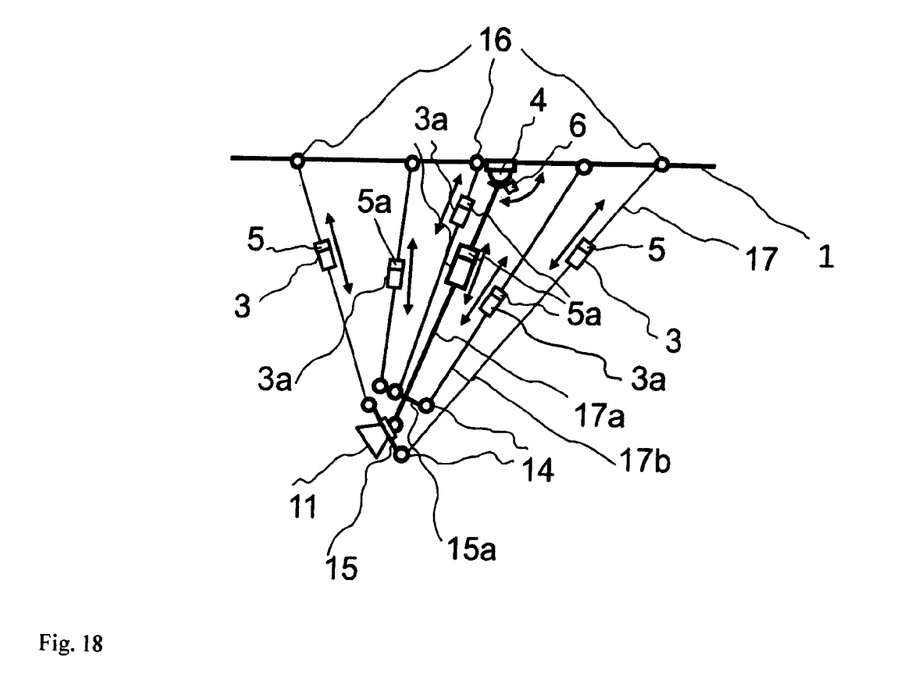

In FIG. 18 there is another alternative of the manipulating arm shown, where the tool 11 is placed on the platform 15 connected to the supporting frame 1 through the spherical joints 14 by means of the suspension arms 17 and a central suspension arm 17*a*. The suspension arms 17 are connected to the supporting frame 1 through the spherical joints 16, the central suspension arm 17*a* is connected to the supporting frame 1 through the rotational joint 4 fitted with the rotation blocking element 6.

The rotational joint 4 of the central suspension arm 17*a* can be also replaced by a spherical joint fitted with a blocking element to block its motion.

The central suspension arm 17*a* passes, before being connected to the platform 15, through the platform 15*a* which is connected to the supporting frame 1 by means of the suspension arm 17*b* fitted with the spherical joints 14 on the side of the platform 15*a* and with the spherical joints 16 on the side of the supporting frame 1.

All the suspension arms within this embodiment, both the suspension arms 17 and the suspension arms 17*a*, are fitted with the sliding guide 3 or 3*a* and the movement blocking element 5 or 5*a*.

Swiveling of the central suspension arm 17*a* can be achieved through the additional platform 15*a* set in motion by extending or shortening a length of the suspension arms 17*b*.

The suspension arms 17 and 17*b* can be alternatively made of strings or cords.

The rotation blocking element 6 can be replaced, without affecting the demanded function of the manipulating arm, by a blocking element arranged in some of the spherical joints 16 which prevents the manipulating arm motion by blocking a respective suspension arm.

Within this embodiment of the manipulating arm six degrees of freedom towards the supporting frame 1 are achieved.

Figure 19:
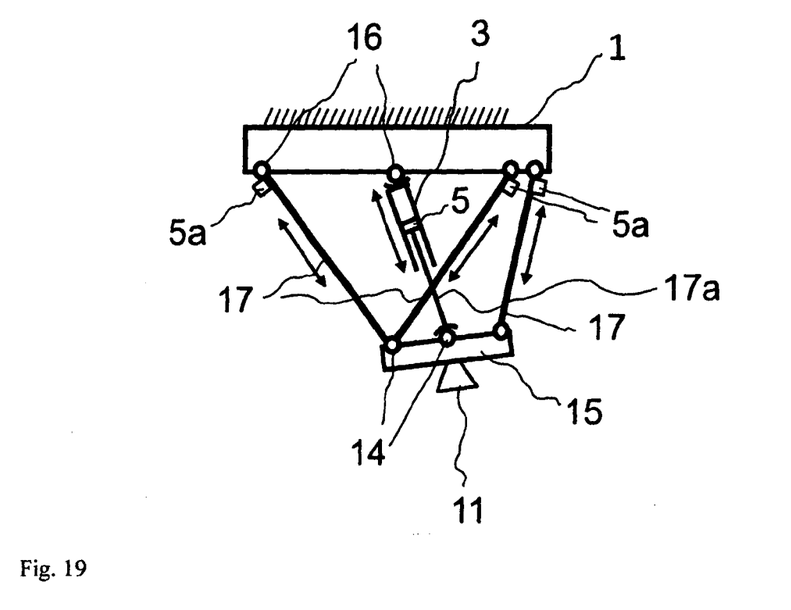

In FIG. 19 another potential embodiment of the manipulating arm is depicted, where a position of the tool 11 attached to the platform 15 is achieved by means of a set of the suspension arms 17 and the central suspension arm 17*a*.

The suspension arms 17 and 17*a* are connected to the platform 15 through the spherical joints 14 and to the supporting frame 1 through the spherical joints 16. Each suspension arm 17 and the central suspension arm 17*a* is fitted with the sliding guide 3 and the movement blocking element 5 or 5*a*.

The suspension arms 17 except the central suspension arm 17*a*, can be alternatively made of strings or cords. Within this embodiment rotation between the central suspension arm 17*a* and the frame 1 need not to be, but can be, blocked, therefore blocking is not shown. Within this embodiment the manipulating arm has three degrees of freedom towards the supporting frame 1.

Figure 20:
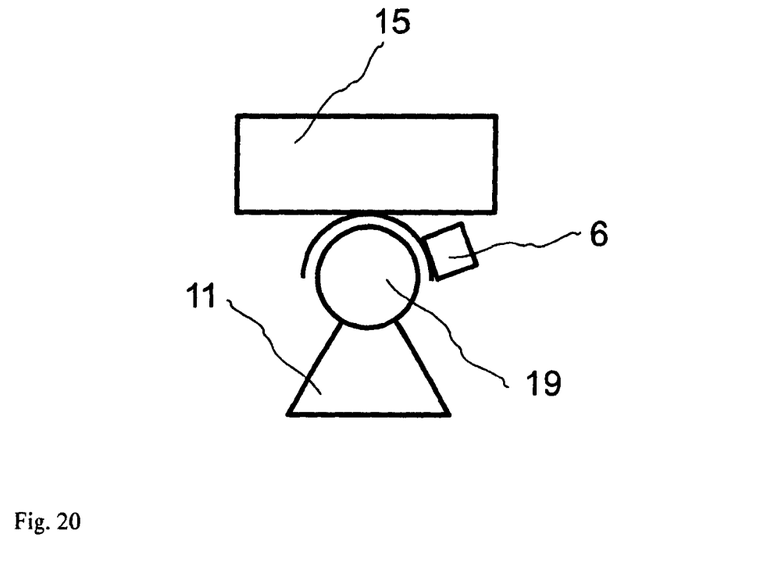

Aside from the above described manipulating arm embodiments there are other ones possible, even more universal. They consist of a mechanism ensuring a position of the platform 15 in space towards the frame 1 and of a mechanism positioned on the platform 15 ensuring orientation of the tool 11 towards the platform 15 and in space towards the frame 1. The solutions described above have mostly combined mechanisms for ensuring the position and orientation of the tool 11. Many of them have let the orientation of the tool 11 freely moveable. To set the orientation of the tool 11 towards the frame 1, a design of a mechanism for the orientation of the tool, which is positioned on the platform 15 is important. The first solution is shown in FIG. 20, where the tool 11 is connected to the platform 15 through the spherical joint 19 rotations of which are blocked by the blocking element 6.

Figure 21:
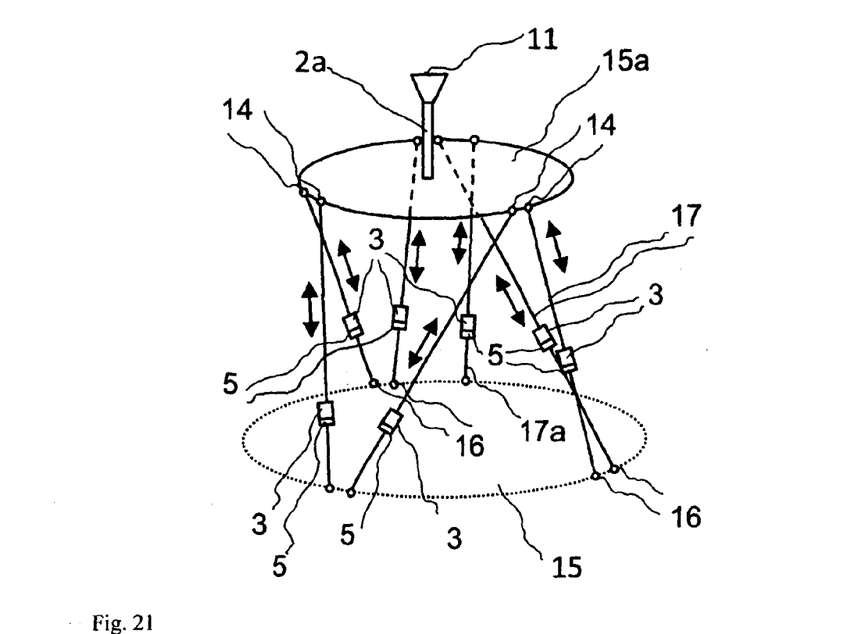

FIG. 21 another potential solution is shown, where the tool 11 is attached to the auxiliary platform 15*a* being attached to the platform 15 by means of a set of the suspension arms 17 a number of which is at least six and is not limited. In FIG. 21 there are seven suspension arms 17. Relation to the embodiment in FIG. 12 is in the fact that here the parallel kinematic structure is only used for the tool 11 orientation and thus it is usually of lesser dimensions. In FIG. 12 it is used for positioning the tool 11 as well. On the contrary, FIG. 21 shows a possible embodiment of the parallel kinematic structure for the tool 11 orientation, possibly even for positioning, with more suspension arms 17 than the minimum number six. In FIG. 21 there are seven positioning arms 17 shown.

Figure 22:
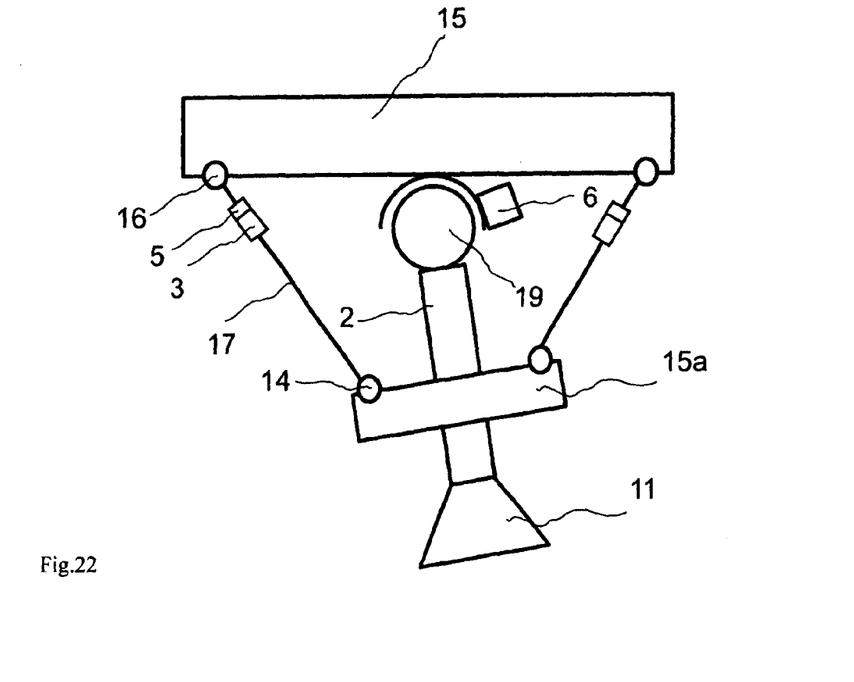

In FIG. 22 there is another potential embodiment of the mechanism for the tool 11 orientation by means of a parallel kinematic structure of HexaShere type shown. This is a schematic depiction. The tool 11 is attached to the holder 2 of the tool 11 which is connected to the platform 15 through the spherical joint 19. The auxiliary platform 15a, which is connected to the platform 15 through the suspension arms 17 is connected to the holder 2 of the tool 11. The suspension arms 17 are fitted with the sliding guides 3 with the movement blocking element 5. Moreover, even some of the spherical joints can be, but need not to be, fitted with rotation blocking by means of the blocking element 6.

The suspension arms 17 are at least three, advantageously six or other number.

Figure 23:
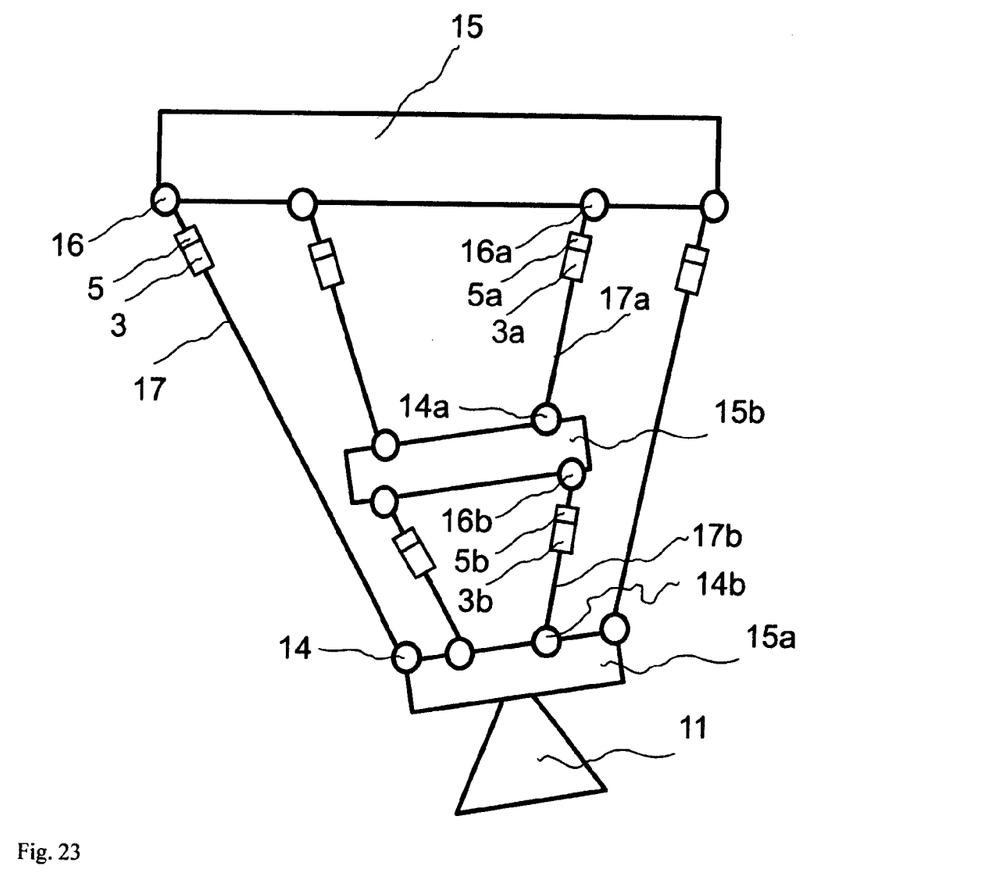

A very general embodiment of the mechanism for the tool 11 orientation is shown in FIG. 23. This is a schematic depiction. The tool 11 is attached to the auxiliary platform 15a which is connected to the platform 15 through another auxiliary platform 15b. The platforms 15, 15a and 15b are interconnected to one another through the suspension arms 17, 17a and 17b fitted with the sliding guides 3, 3a and 3b with the movement blocking elements 5, 5a and 5b with the aid of the spherical joints 16, 14, 16a, 14a, 16b, 14b. Number of suspension arms 17, 17a and 17b can vary. A minimum number is when number of degrees of freedom of the tool 11 is zero while blocking elements are on. A maximum number is not limited. Higher number of the suspension arms increases the tool 11 rigidity. Except for the sliding guides 3, 3a and 3b, blocking elements can be also placed on the spherical joints to block rotation.

By a special mutual geometric position of the suspension arms 17, 17a and 17b, for example by their parallelism, and by choice of their size, kinematic equivalents both of all the above described embodiments and of a number of other embodiments can be obtained.

The spherical joints in the described embodiments can be designed in different ways, for example as a ball joint or a Cardan joint. The suspension arms 17, 17a and 17b can be alternatively made of strings or cords.

Movements and rotations are without actuators in the described embodiments. A part of them or all movements and rotations can be equipped with actuators.

The device is equipped with a computer for calibration, measurements, computations and control of needed positions of the manipulating arms fitted with the tools 11.

When setting a position of the manipulating arms fitted with the tools at first the movement blocking elements 5 and the rotation blocking elements 6 are unblocked in order to release motion of the manipulating arms in their placement and to release motion between individual moveable parts. Subsequently the manipulating arm is grabbed by the grab 10 of the robot 9 by which the manipulating arm is relocated to a new demanded position where the movement blocking elements 5 and the rotation blocking elements 6 get blocked. This way each manipulating arm placed on the supporting frame 1 is relocated. Blocking and unblocking of the movement blocking elements 5 and the rotation blocking elements 6 is performed by their connecting to an external power source 7. While rearranging the position this way, the supporting frame can be possibly placed in the positioning fixture 8.

Alternatively, relocation of the manipulating arms can be achieved by gripping the manipulating arm by the positioning fixture 8 by means of which the manipulating arm is hold, while by grabbing the supporting frame 1 by the grab 10 of the robot 9 the positioning arm is relocated to the new position towards the supporting frame 1.

In order to determine a position of the manipulating arms, before their relocating to the demanded position the supporting frame 1 is clamped to the fixture 8 while the position of the manipulating arms is measured by the position of the grab 10 of the robot 9 which performs relocation of the manipulating arms. The position of the manipulating arms can be alternatively measured by scanning the position of the luminous spots 12 on the manipulating arm or on the grab 10 of the robot relocating the manipulating arms with the help of digital cameras or video-cameras 13.

Obtaining data for calibration and measurements, computations and control of needed positions of the manipulating arms fitted with the tools 11 is performed by a computer.

The used sliding, rotational and spherical joints and blocking elements, as well as the suspension arms and strings or cords can be made advantageously of nonmetallic, easily deformable materials, e.g. carbon composites.

The invention claimed is:

1. A supporting structure, comprising:
   a frame;
   a first plurality of length adjustable suspension arms, each arm having first and second ends, the first end of each arm coupled to the frame;
   a first tool platform coupled to the second ends of the suspension arms in the first plurality of arms, the first tool platform having an opening defined therethrough;
   a second plurality of length adjustable suspension arms, each arm having first and second ends, the first end of each arm coupled to the frame;
   a second tool platform coupled to the second ends of the suspension arms in the second plurality of arms; and
   a central suspension arm having first and second ends, the first end coupled to the frame and the second end coupled to the second tool platform,
   wherein each suspension arm in the first and second pluralities of suspension arms comprises a sliding guide for setting a length of the respective suspension arm and a corresponding movement blocking element for maintaining the set length, and
   wherein the central suspension arm passes through the opening in the first tool platform.

2. The supporting structure of claim 1, further comprising:
   a first plurality of spherical joints, each spherical joint respectively coupling the first and second ends of the suspension arms in the first and second plurality of arms and the central suspension arm to the corresponding frame, the first tool platform or the second tool platform.

3. The supporting structure of claim 2, further comprising:
   a plurality of rotation blocking elements, corresponding to each spherical joint, configured to maintain a position of the respective spherical joint.

4. The supporting structure as recited in claim 1, wherein:
   a first number of suspension arms in the first plurality of arms is greater than a second number of suspension arms in the second plurality of arms.

5. The supporting structure as recited in claim 3, wherein:
   the movement blocking elements and the rotation blocking elements are moved by one of:
   hydraulic power; or
   electrical power.

6. The supporting structure as recited in claim 1, wherein each suspension arm in the first plurality of suspension arms comprises one of: a string or a cord.

7. The supporting structure as recited in claim 1, wherein each suspension arm in the second plurality of suspension arms comprises one of: a string or a cord.

8. The supporting structure as recited in claim 1, wherein the central suspension arm comprises one of: a string or a cord.

9. The supporting structure as recited in claim 1, further comprising a tool disposed on the second tool platform.

10. The supporting structure as recited in claim 9, wherein the tool is one of:
   a sucker;
   a measuring probe;
   a grab;
   a machining tool; or
   a welding head.

11. The supporting structure as recited in claim 9, further comprising at least one luminous spot provided on the tool.

\* \* \* \* \*